(12) United States Patent
Karas et al.

(10) Patent No.: US 10,416,340 B2
(45) Date of Patent: Sep. 17, 2019

(54) AUTONOMOUS CONTAINER-TRANSPORTABLE SYSTEM FOR VEHICLE SCANNING

(71) Applicant: ADANI Systems, Inc., Alexandria, VA (US)

(72) Inventors: Vladimir Karas, Minsk (BY); Vladimir N. Linev, Minsk (BY)

(73) Assignee: Adani Systems, Inc., Alexandria, VA (US)

( * ) Notice: Subject to any disclaimer, the term of this patent is extended or adjusted under 35 U.S.C. 154(b) by 236 days.

(21) Appl. No.: 15/607,446

(22) Filed: May 27, 2017

(65) Prior Publication Data

US 2018/0341039 A1    Nov. 29, 2018

(51) Int. Cl.
*G01V 5/00* (2006.01)

(52) U.S. Cl.
CPC .................................. *G01V 5/0016* (2013.01)

(58) Field of Classification Search
None
See application file for complete search history.

(56) References Cited

U.S. PATENT DOCUMENTS

| | | | |
|---|---|---|---|
| 5,065,418 A | 11/1991 | Bermbach et al. | |
| 6,241,452 B1* | 6/2001 | Eekhoff | B60P 1/43 14/71.1 |
| 6,542,580 B1 | 4/2003 | Carver et al. | |
| 7,001,132 B2* | 2/2006 | Koretsky | A61G 3/061 414/537 |
| 7,789,258 B1 | 9/2010 | Anderson | |
| 8,079,377 B2* | 12/2011 | Jenkins | B08B 17/00 134/123 |
| 2006/0245548 A1 | 11/2006 | Callerame et al. | |
| 2009/0074138 A1* | 3/2009 | Knoespel | B64F 1/366 378/57 |
| 2011/0064192 A1 | 3/2011 | Morton et al. | |
| 2011/0222733 A1* | 9/2011 | Smith | G01N 23/087 382/104 |
| 2013/0177134 A1* | 7/2013 | Tay | G01V 5/0016 378/57 |
| 2014/0211916 A1* | 7/2014 | Morton | G01V 5/0016 378/57 |
| 2015/0325010 A1* | 11/2015 | Bedford | G06T 11/003 378/19 |

FOREIGN PATENT DOCUMENTS

WO    2018/026792    6/2018

* cited by examiner

*Primary Examiner* — Hoon K Song
(74) *Attorney, Agent, or Firm* — Bardmesser Law Group (57) ABSTRACT

A containerized system for vehicle scanning, includes a container; the container having a vertically movable top portion of the container, the top portion including an X-ray source and a collimator; the container having a bottom portion, the bottom portion including a first linear X-ray detector; an entry ramp that rotates to a vertical position in a transportable state and functions as a first wall of the container, the entry ramp being foldable so as not to exceed a height of the container in the transportable state; an exit ramp that rotates to a vertical position in the transportable state and functions as a second wall of the container, the entry ramp being foldable so as not to exceed a height of the container in the transportable state; a generator for autonomous operation; and an operator station for display of scan data.

7 Claims, 12 Drawing Sheets

AUTONOMOUS CONTAINER-TRANSPORTABLE SYSTEM FOR VEHICLE SCANNING

BACKGROUND OF THE INVENTION

Field of the Invention

The invention relates to scanning systems, and, more particularly, to an autonomous transportable system for vehicle scanning.

Description of the Related Art

One of the issues facing vehicle scanning technology is portability and transportability. In many cases, vehicles need to be scanned for contraband or people hiding in the vehicles, and the scanning station needs to be set up in the open, or where circumstances require, without regard for any preexisting infrastructure. Conventional scanners have a number of limitations, such as dependence on infrastructure (for example, dependence on the electrical grid), a relatively large size that makes it inconvenient to transport the scanner, and a limitation on the physical sides, particularly height, of the vehicle, which may since it's difficult to scan some of the van-sized vehicles.

Accordingly, there is a need in the art for a vehicle scanning system that addresses the above shortcomings.

SUMMARY OF THE INVENTION

The invention relates to a containerized vehicle X-ray scanning system that substantially overcomes one or more disadvantages of the related art.

In an exemplary embodiment, a containerized system for vehicle scanning, includes a container; the container having a vertically movable top portion of the container, the top portion including an X-ray source and a collimator; the container having a bottom portion, the bottom portion including a first linear X-ray detector; an entry ramp that rotates to a vertical position in a transportable state and functions as a first wall of the container, the entry ramp being foldable so as not to exceed a height of the container in the transportable state; an exit ramp that rotates to a vertical position in the transportable state and functions as a second wall of the container, the entry ramp being foldable so as not to exceed a height of the container in the transportable state; a generator for autonomous operation; and an operator station for display of scan data.

Optionally, the X-ray generates X-rays at two different wavelengths. Optionally, the generator is located in a separate compartment. Optionally, the operator station is located in a separate compartment. Optionally, vertically movable top portion is movable using hydraulic actuators. Optionally, the containerized system, in the transportable state, is approximately a size of an intermodal shipping container. Optionally, there are two vertical detectors on either side of the vehicle.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
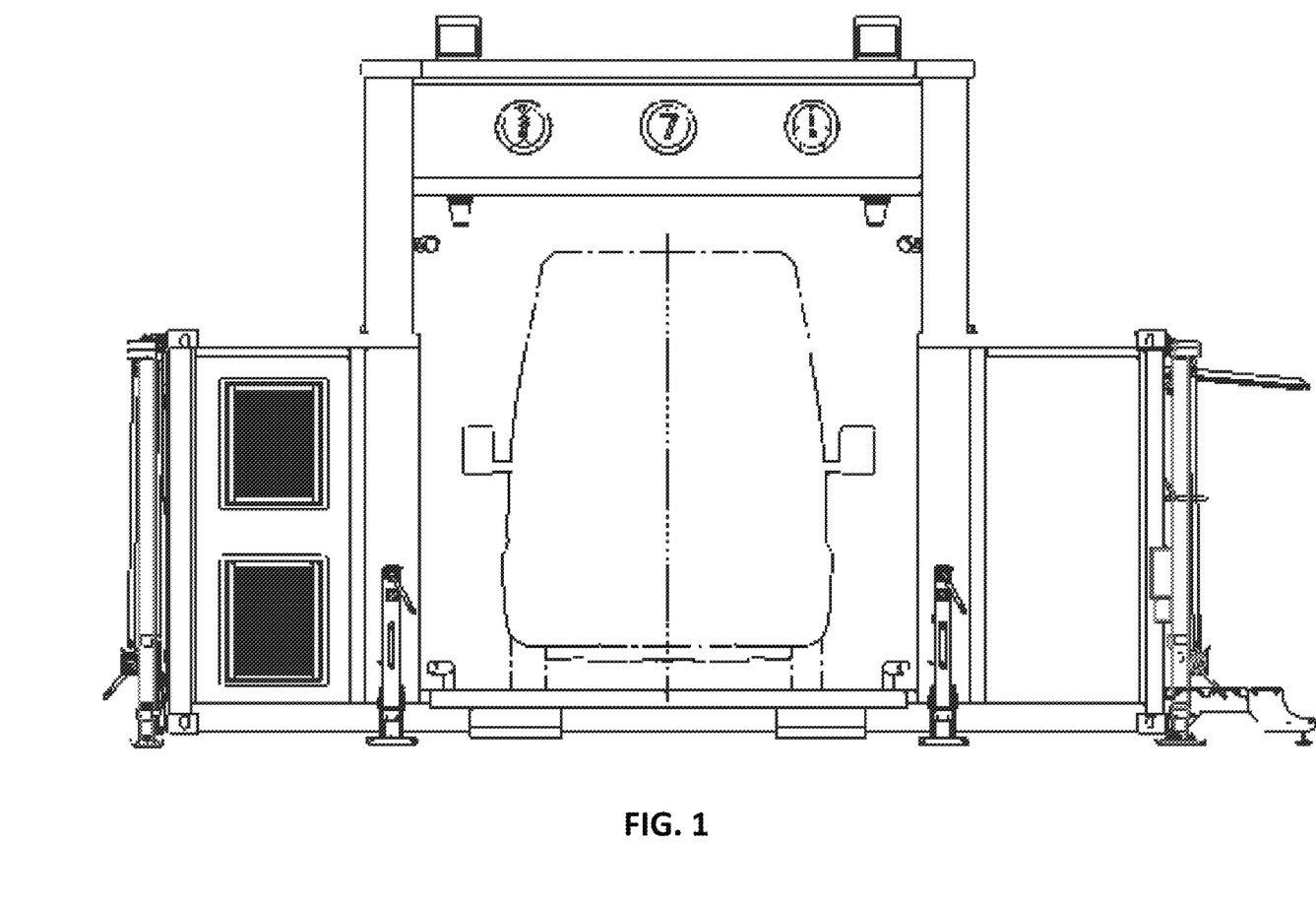
FIG. 1 is a side view of the containerized scanning station in an operational mode.

FIG. 1 illustrates an exemplary containerized scanning system in a deployed configuration. The proposed scanning system of the present invention is intended to take the form factor of an intermodal shipping container, or similar, so as to facilitate easy transport of the system on a truck or, if necessary, a railroad. Typical dimensions of the containerized system, when in a folded (shipping) mode, are approximately 6.6 meters by 2.5 meters by 2.5 meters. As further shown in FIG. 1, the scanner (central) portion of the container can be raised when deployed, so as to permit relatively tall vehicles, such as vans, to pass through the scanning system.

Additionally, the containerized scanning system is autonomous in a sense that it does not require connection to the electrical power grid (although it can be connected to the grid if available). In FIG. 1, on the left side of the figure is a compartment that contains a generator, fuel, air conditioning systems if needed, and other electrical hardware. On the right in FIG. 1 is a compartment where the operator work station is located, and where the operator sits during the scanning process.

Figure 2:
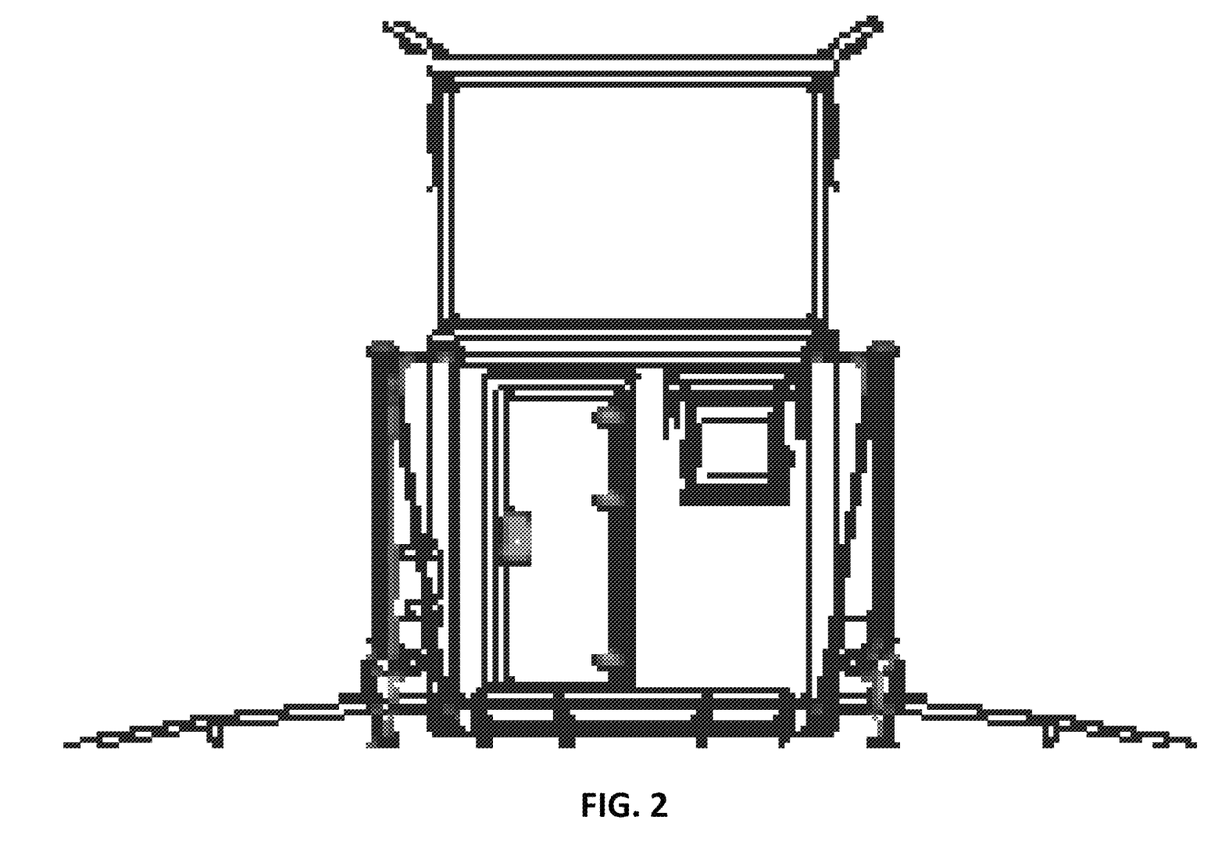
FIG. 2 shows an edge on view of the containerized scanning station, from the operator station side.
Figure 10:
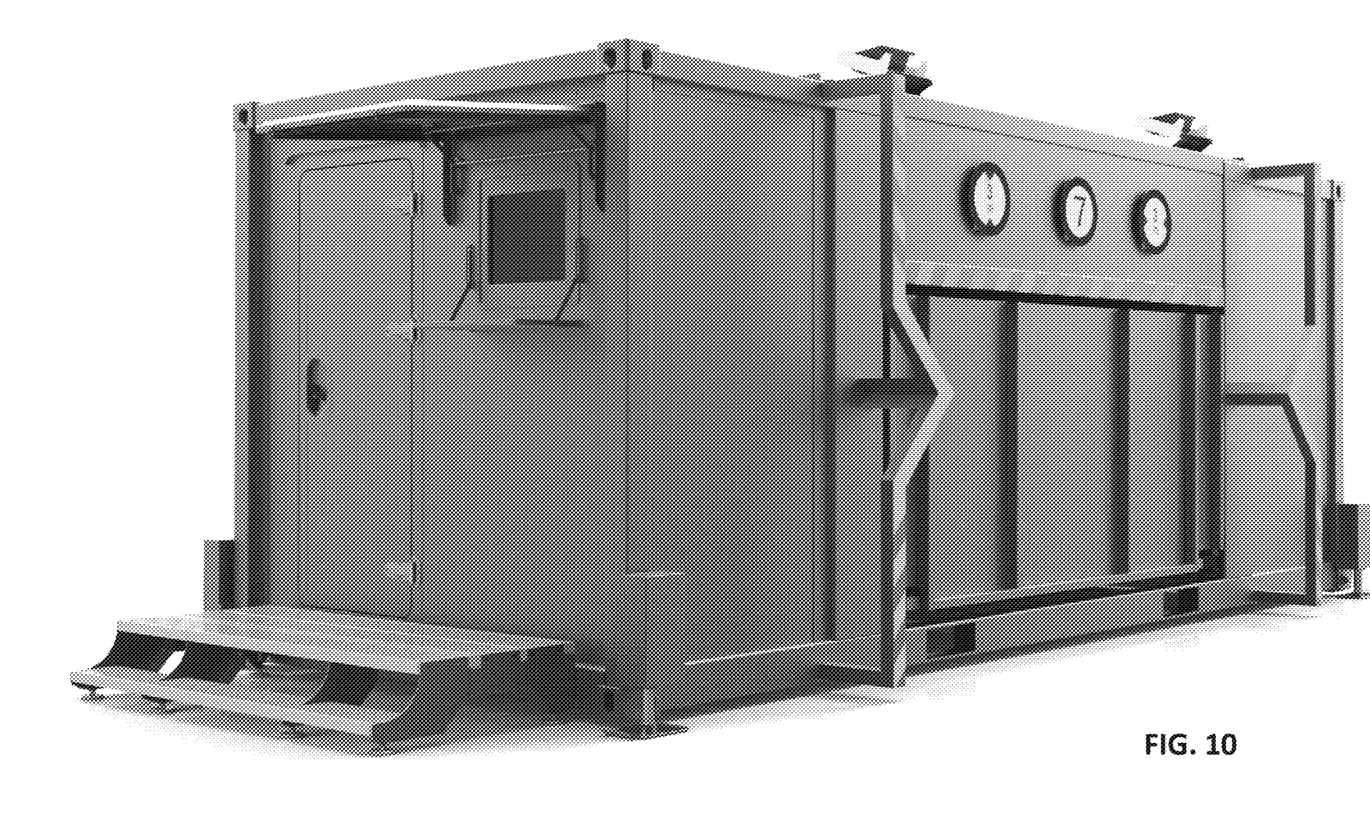
FIG. 10 shows another isometric view of the containerized scanning station, also showing the operator compartment.

FIG. 2 illustrates an edge of the deployed system, showing the on and off ramps, and the operator compartment. Note that the on and off ramps are articulated (foldable), so that when the container is configured for transport, the ramps form part of the wall, in their folded state. This is also visible in FIG. 10, showing the portion of the on ramp in the center of the container.

Figure 3:
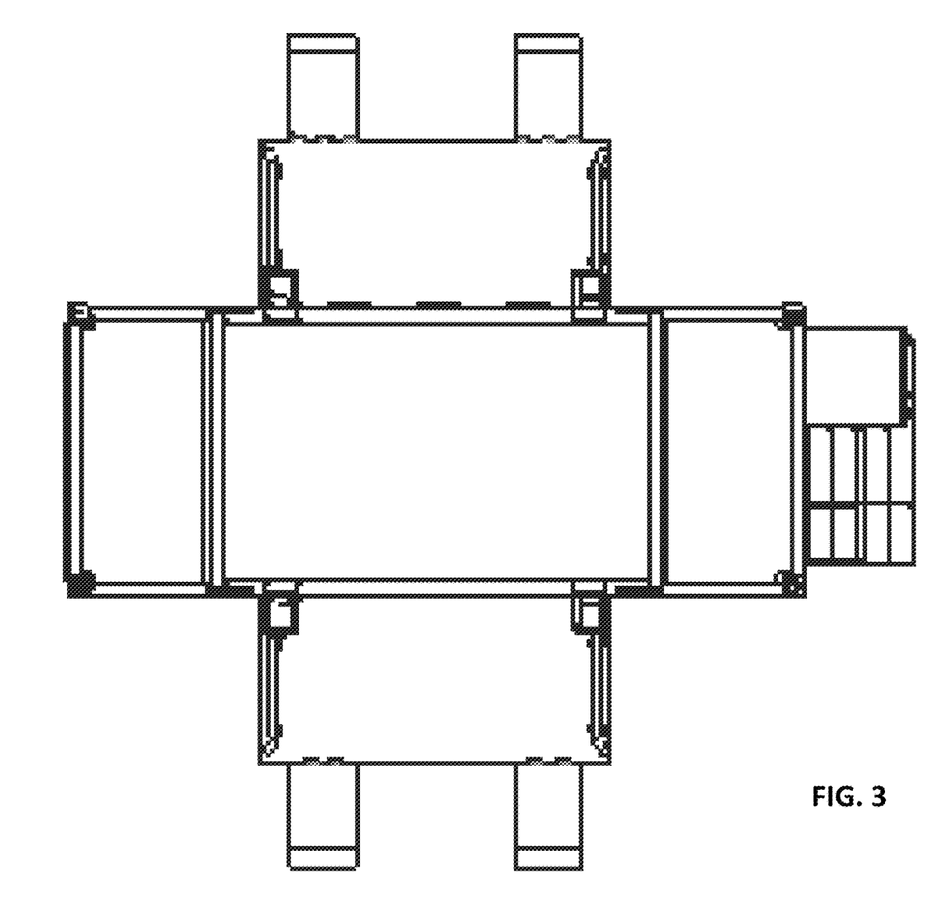
FIG. 3 illustrates a top plan view of a deployed containerized scanning station.

FIG. 3 illustrates the containerized scanning system in a deployed configuration, as seen from above. The on-off ramps, in this case, have their extended portion only for the wheels of the vehicle (unlike in FIG. 12, for example, where the ramp is as wide as the opening into the scanning system along its entire width. Also, in FIG. 3, the steps used by the operator to enter the operator compartment are visible.

Figure 4:
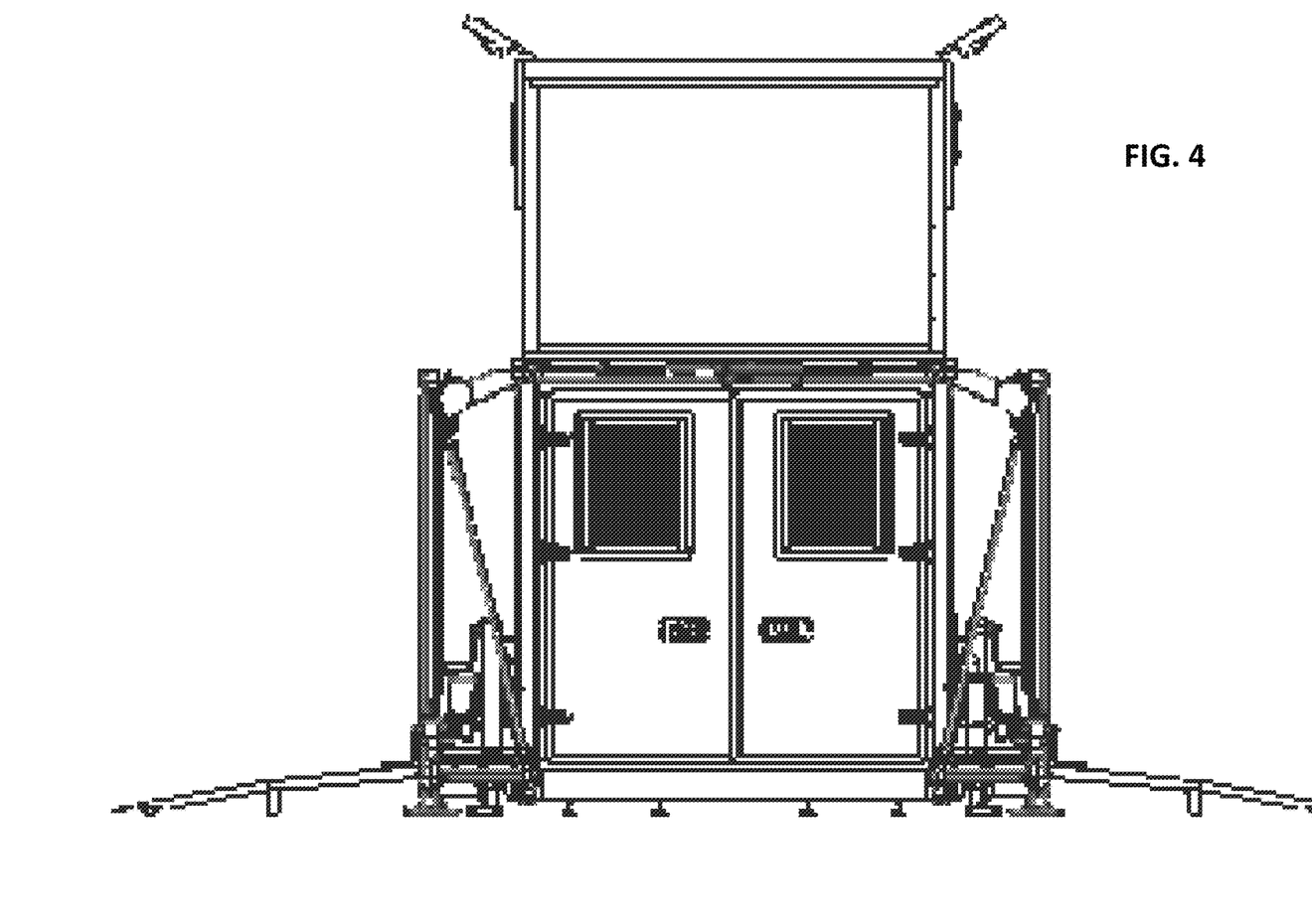
FIG. 4 shows another edge on view, from the generator sign, of the containerized scanning station.

FIG. 4 illustrates another edge of the view of the container, from the side with the generator compartment.

Figure 5:
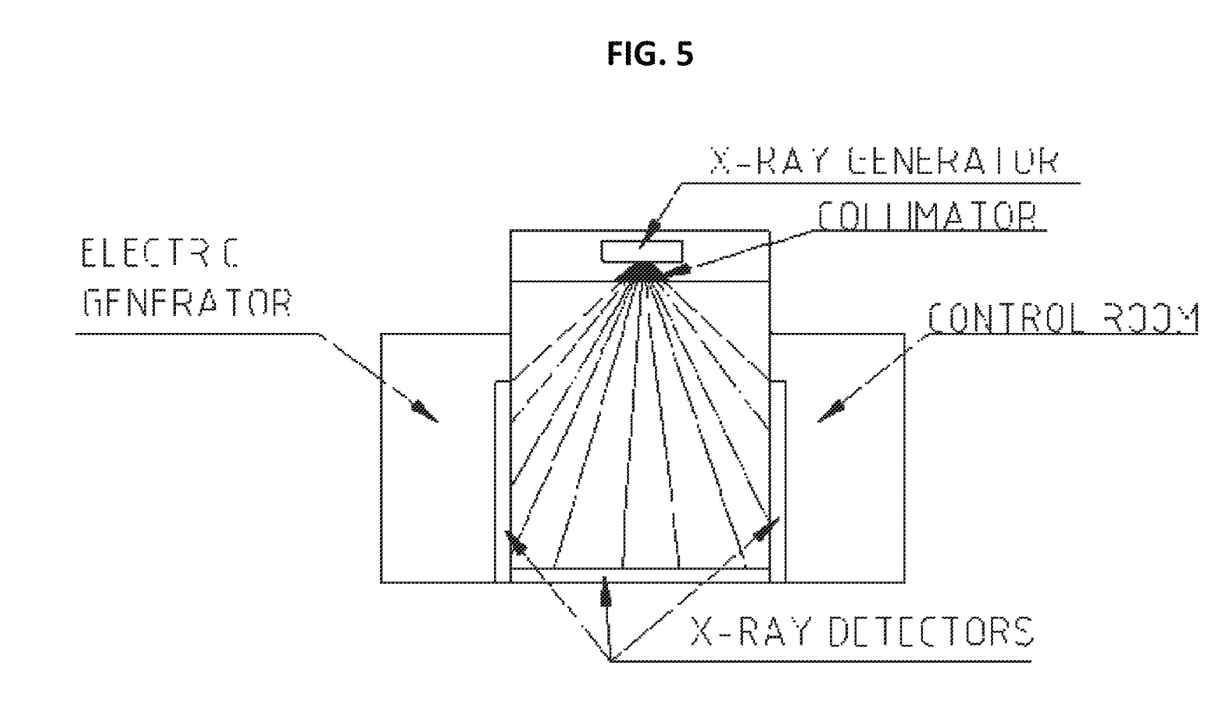
FIG. 5 shows a schematic, with the x-ray source on top, the x-ray detector is on the bottom and the sides of the container, the operator control room on the right in the schematic, and the electric generator on the left.
Figure 6:
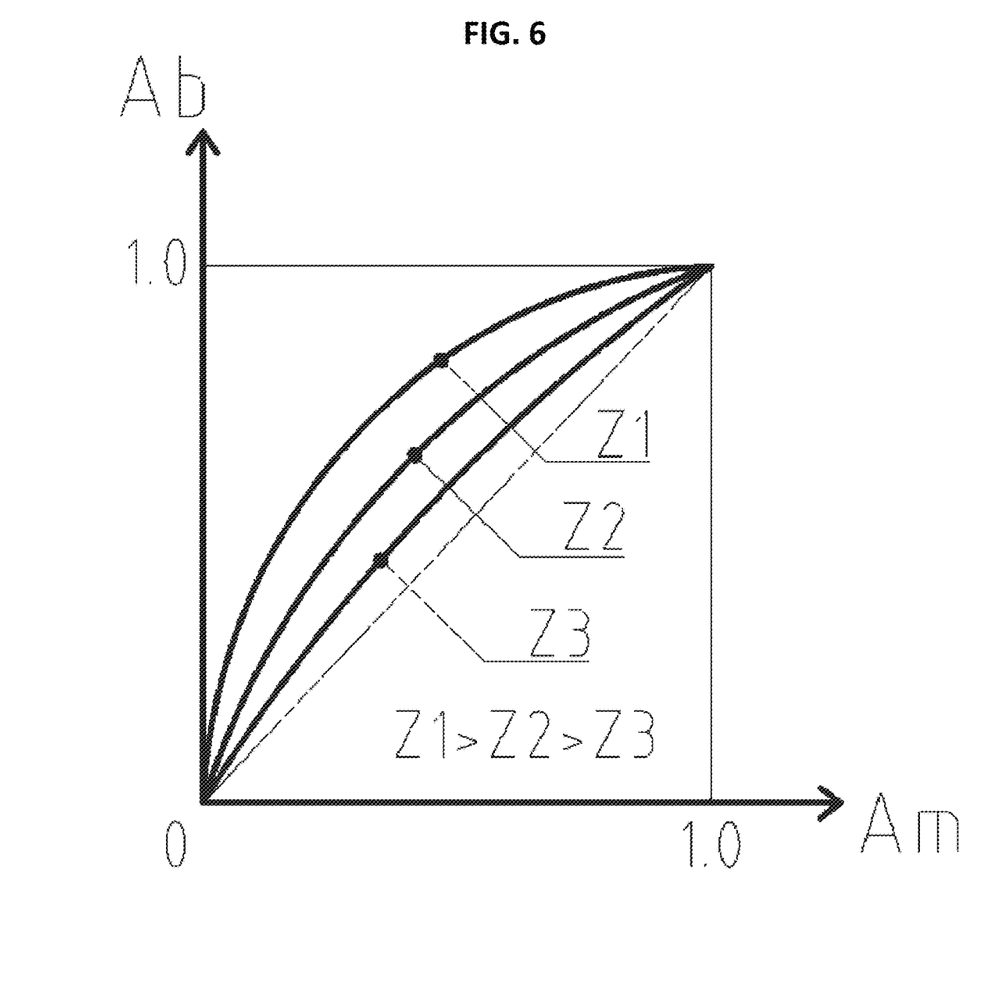
FIGS. 6, 7 and 8 show X-ray detection curves used to identify suspicious substances.

FIG. 5 illustrates a schematic showing that the x-ray source is located above the vehicle, and can be raised and lowered together with the central upper section of the container that is raised and lowered. As shown in FIG. 6, the x-ray source and the collimator generate a fan-shaped beam, which is then detected by three linear detectors, including one detector on the floor, and two detectors on the sides of the vehicle.

Since the system uses detectors that registers X-rays of two different energies (high and low), therefore, the processing involves identifying a signal from the same substance but at two different X-ray energies. FIG. 6 shows dependence of the signal at a high energy Ab, i.e., the energy registered by the detector when a high energy X-ray passes through the substance, as a function of the low energy X-ray signal, for several disfferent substances having an atomic number Z (or, for complex chemicals, an effective atomic number). In this figure, Z1 is a metal, Z2 is an organic substance, Z3 is an inorganic substance.

The curves show the signal level as a function of the thickness of the material in question. The curves are stored in a database, and then used to identify the substance during the scan. The signals are typically normalized to a maximum value set to 1. The points on the curves correspond to various coefficients of absorbtion of the X-rays when the thickness changes, from zero (Ab=Am=1) up to a maximum when all the X-rays are absorbed (Ab=Am=0).

By measuring the detected energies for different X-ray sources with different X-ray wavelengths, and comparing them to the curves in FIG. 6, it is possible to find a curve that fits closely (i.e., a measured point lies on the curve, and, by matching Ab and Am, to identify Z.

Figure 7:
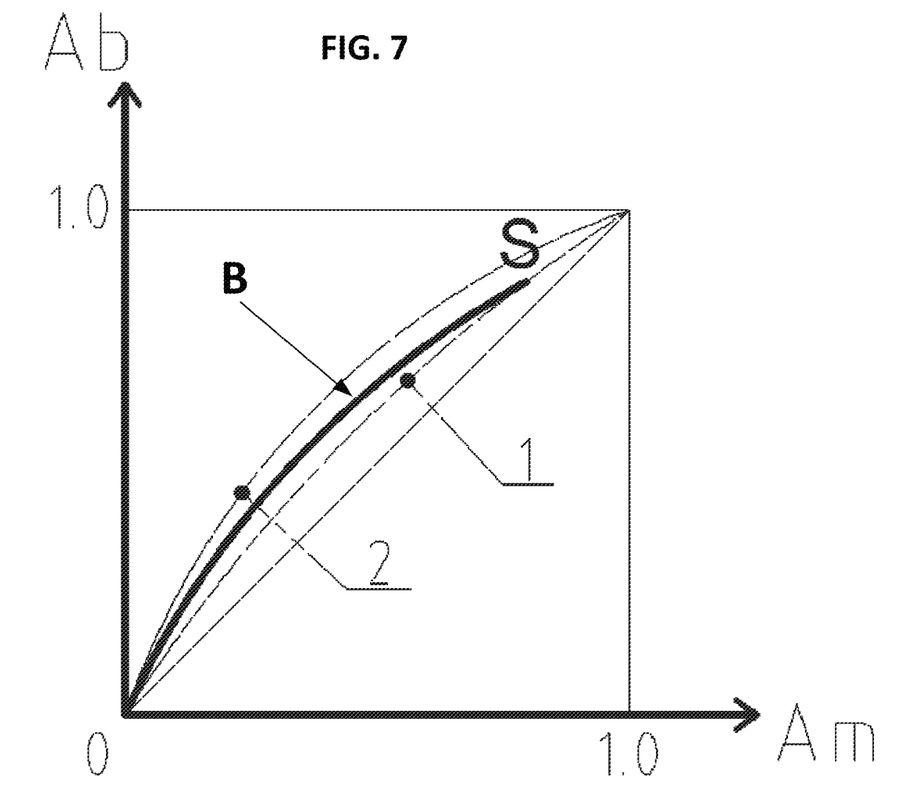

FIG. 7 shows a signal dependence of a high energy X-ray on relative to a low energy X-ray when two substances are being scanned: a background substance with a defined thickness with $Z=Z_s$ (point S) and the substance that needs to be identified (with $Z=Z_i$) when the thickness changes from zero (point S) to maximum absorption (point 0) Any substance can be background-air in the simplest case, which corresponds to the point S where the signal values are Ab=Am=1.

Thus, FIG. 7 shows determining a substance when the signal also shows the presence of a known or background substance. Line 1, which goes through point S, shows a dependence for the background material in the absence of another material that needs to be identified. Line 2 shows a dependence for the material that needs to be identified in the absence of the background material.

Line B is the curve of interest, which shows a combination of the two curves. To identify materials with different values of $Z_i$ (but the same background material), these curves would all start at point S, and initially diverge (and then converge again). The shapes of the curves depend on the values of $Z_i$.

Figure 8:
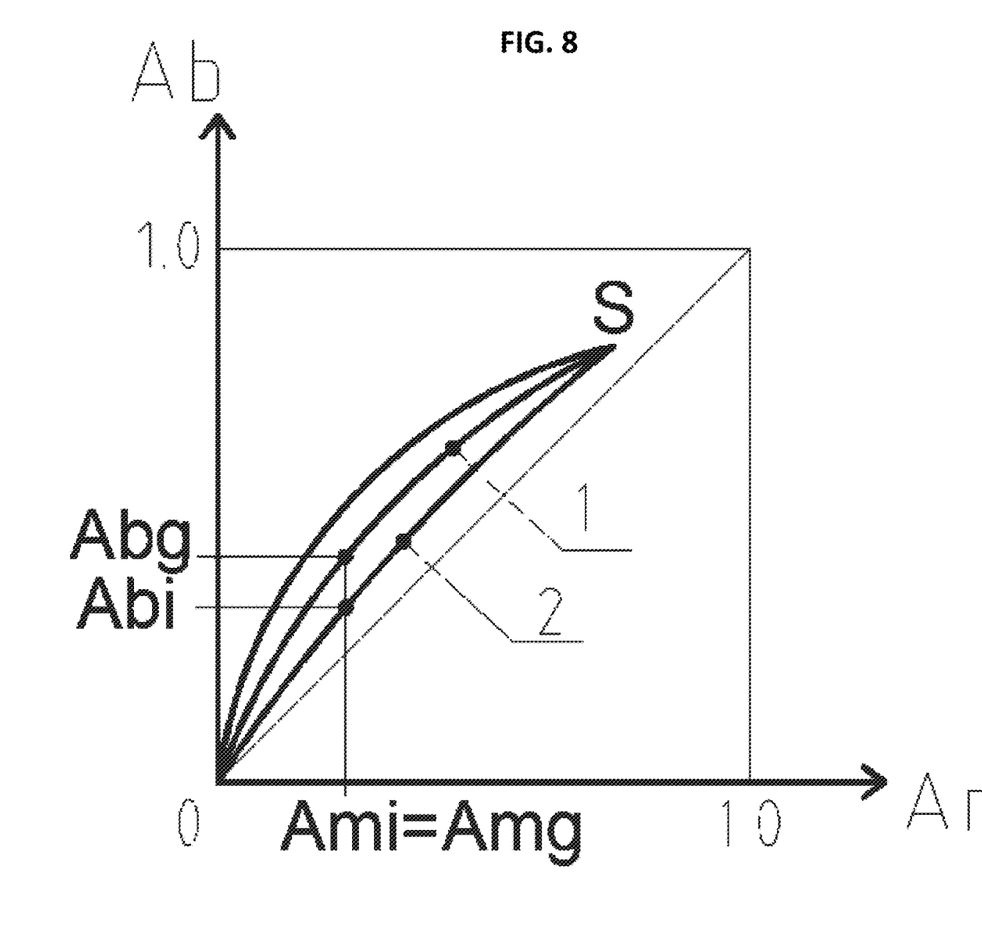

FIG. 8 shows identification of a substance when scanning a number of different such substances, and identifying a specific one. If curve 1 is the baseline curve when scanning a background material (point S) and the material in question with $Z=Z_0$, for different thicknesses from zero to full absorption.

The values of the detected signals for the combination of background material and material question, e.g., Abi and Ami in curve 2 are compared to the baseline curve values, e.g., Abg and Amg. If there is no match, then, Zi is not $Z_0$. If there is a match, then, the material with the atomic number Zi is identified and reported.

Figure 9:
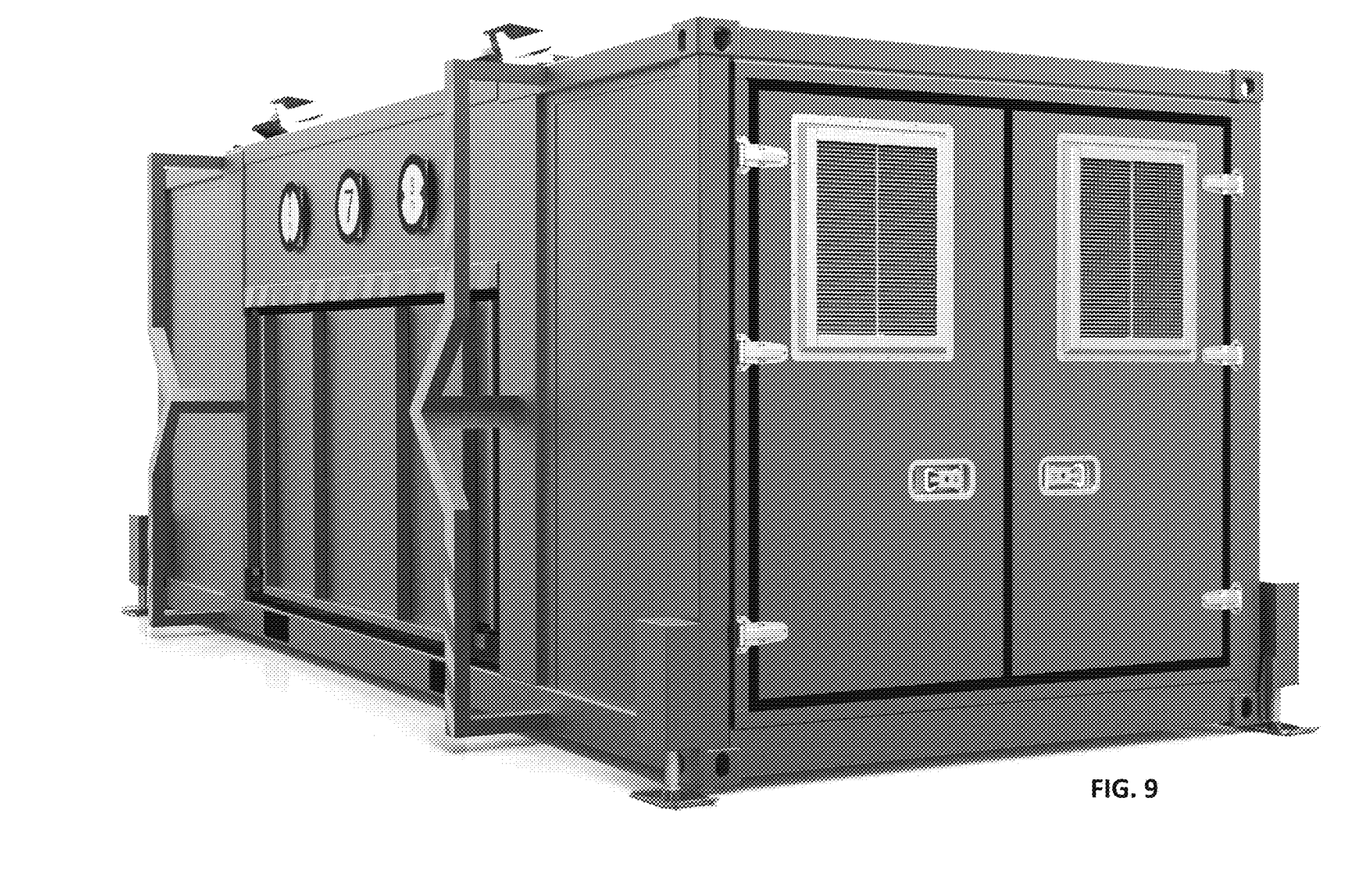
FIG. 9 illustrates an isometric view of the containerized scanning station, with the generator compartment doors closed, and the vehicle ramps raised.

FIGS. 9, 10, 11, and 12 illustrate various isometric views of the containerized scanning system. FIG. 9 shows a view illustrating the generator compartment, and the rest of the system in a configuration for transportation, with on and off ramps folded and raised, and the central portion lowered. FIG. 10 is another isometric view, showing the operator compartment, with the operator's steps deployed.

Figure 11:
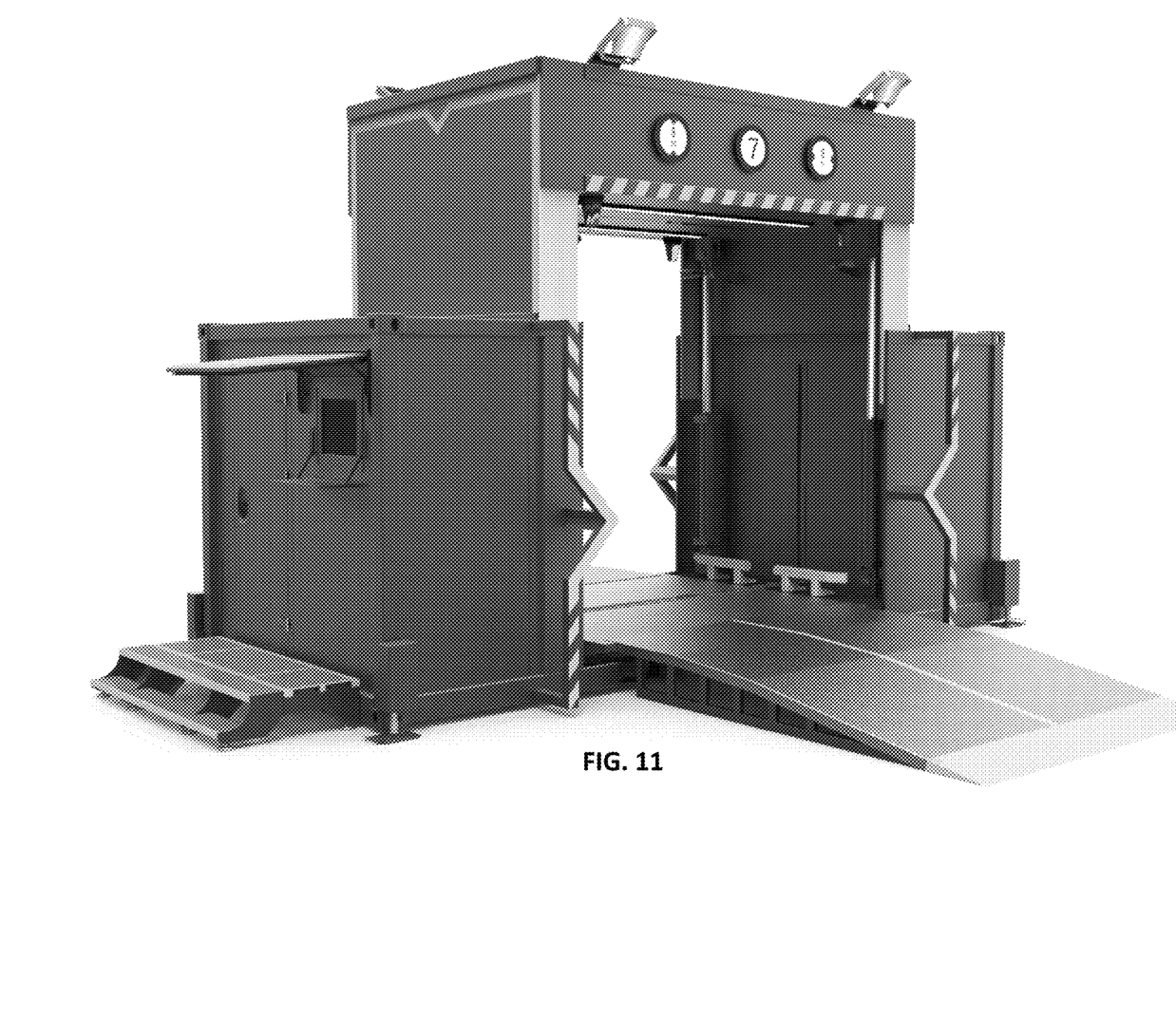
FIG. 11 illustrates the containerized scanning station in a deployed configuration.
Figure 12:
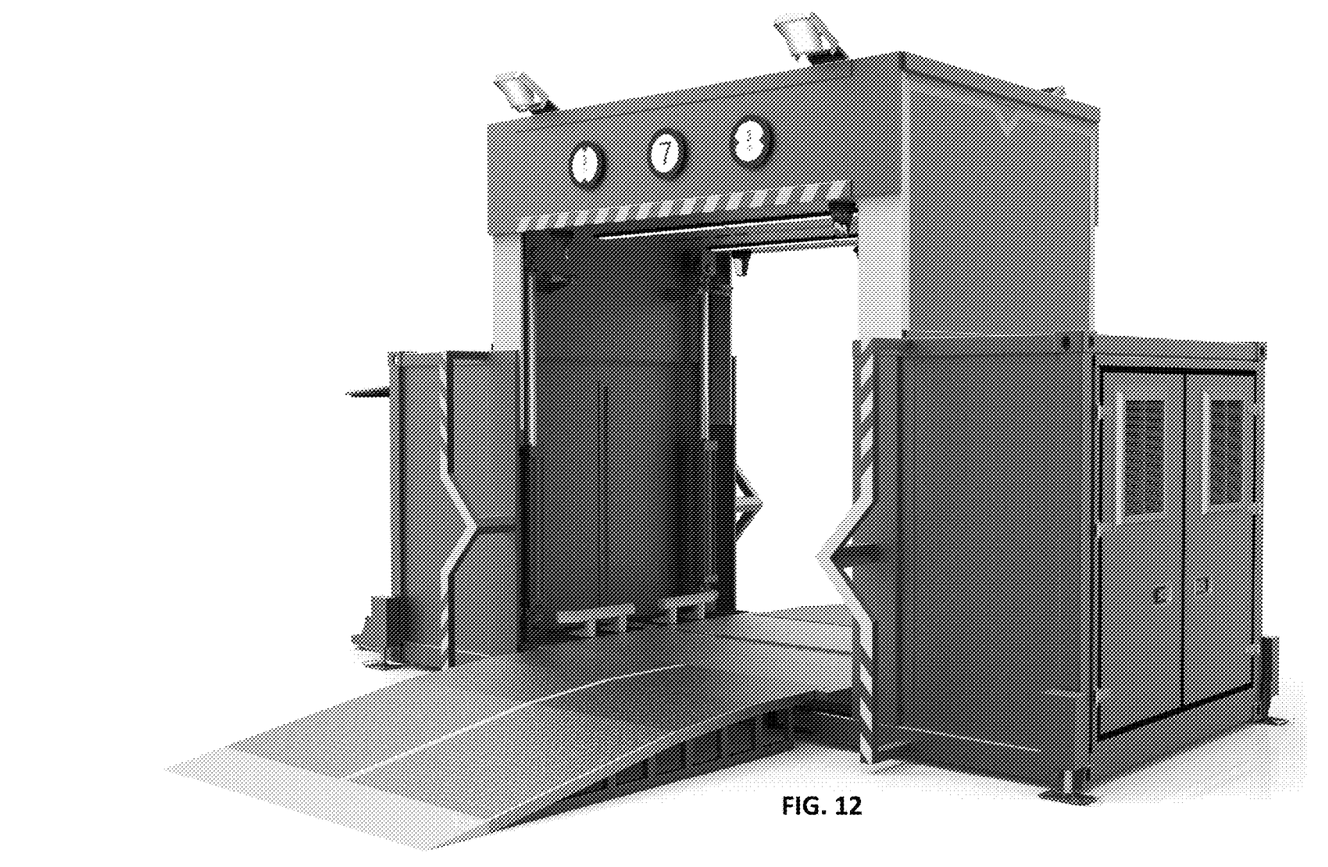
FIG. 12 is another isometric view of the containerized scanning station in a deployed configuration.

FIGS. 11 and 12 show the containerized scanning system and a fully deployed configuration, would be on and off ramps unfolded and lowered, and the central portion raised. In FIGS. 11 and 12, note the hydraulic actuators that are used to raise and lower the central portion.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A containerized system for vehicle scanning, comprising:
   a container;
   the container having a vertically movable top portion of the container, the top portion including an X-ray source and a collimator;
   the container having a bottom portion, the bottom portion including a first linear X-ray detector;
   an entry ramp that rotates to a vertical position in a transportable state and functions as a first wall of the container, the entry ramp being foldable so as to reduce its length to not exceed a height of the container in the transportable state;
   an exit ramp that rotates to a vertical position in the transportable state and functions as a second wall of the container, the entry ramp being foldable so as to reduce its length to not exceed a height of the container in the transportable state;
   a generator for autonomous operation; and
   an operator station for display of scan data.

2. The system of claim 1, wherein the X-ray generates X-rays at two different wavelengths.

3. The system of claim 1, wherein the generator is located in a separate compartment.

4. The system of claim 1, wherein the operator station is located in a separate compartment.

5. The system of claim 1, wherein vertically movable top portion is movable using hydraulic actuators.

6. The system of claim 1, wherein the containerized system, in the transportable state, is approximately a size of an intermodal shipping container.

7. The system of claim 1, further comprising two vertical detectors on either side of the vehicle.

* * * * *